Figure 5:
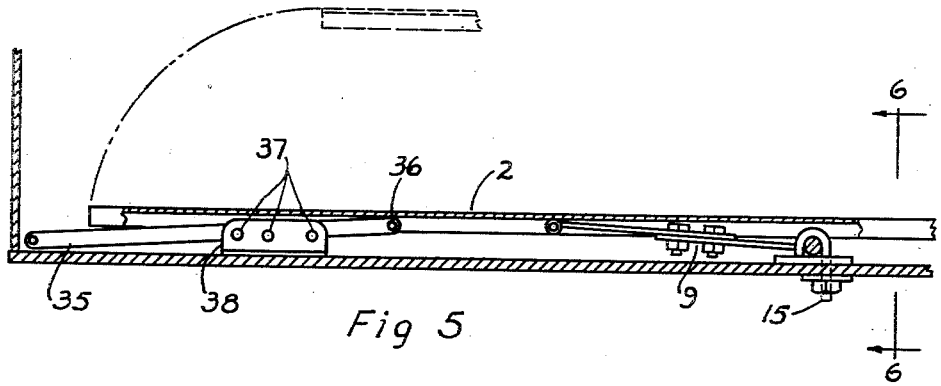

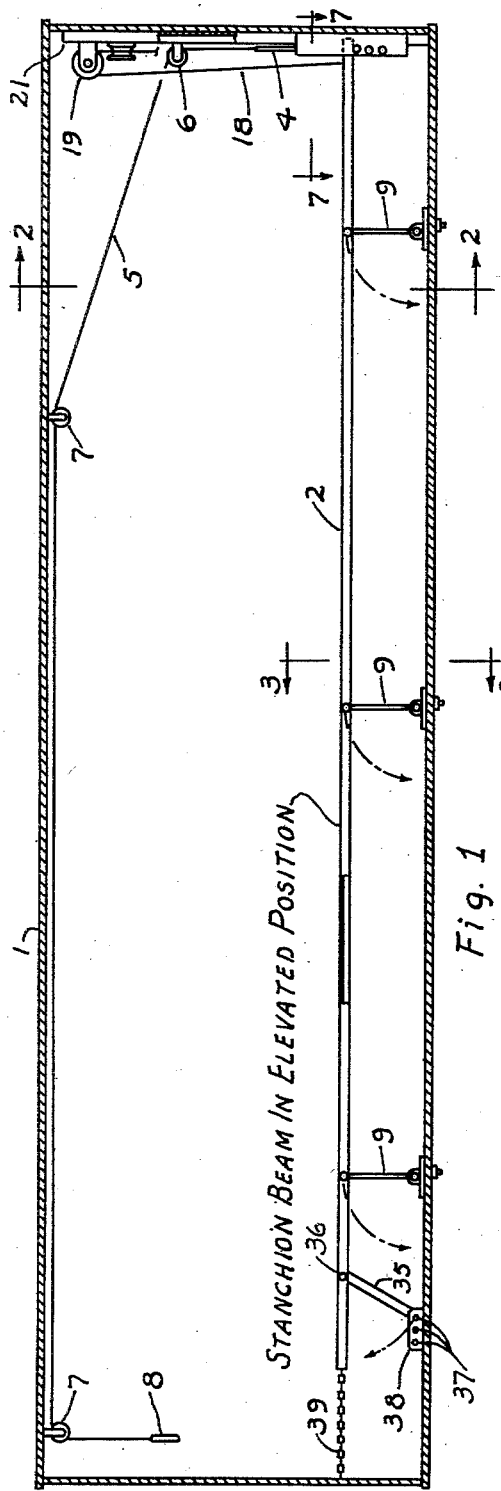

June 9, 1953  J. A. NE CASEK  2,641,222
CATTLE SHIPPER'S STANCHION
Filed March 30, 1951 2 Sheets-Sheet 2

INVENTOR:
J. ARTHUR NE CASEK
BY: Philip J. Liggett
ATTORNEY

Patented June 9, 1953

2,641,222

UNITED STATES PATENT OFFICE 2,641,222

CATTLE SHIPPER'S STANCHION

Joseph Arthur Ne Casek, Chicago, Ill.

Application March 30, 1951, Serial No. 218,433

2 Claims. (Cl. 119—13)

This invention relates to an adjustable and retractible or collapsible horizontal beam type of stanchion for use in combination with a cattle-carrying vehicle and for maintaining cattle in alignment and in an upright position while they are in transit.

It has been found that there are large annual losses of cattle and other animals resulting from their shipment to market. In many cases the animals either lie down or fall down on the floor of the conveyance, so that they are killed or injured by being trampled by the other animals.

It is thus a principal object of the present invention to provide a stanchion arrangement having a movable elongated beam which can be raised or elevated under the bellies of cattle after they are loaded in a vehicle so that they are thereby prevented from lying or falling down.

It is a further object of the present invention to provide a form of horizontal beam or stanchion member which is readily pivotally connected to all types of cattle-carrying conveyances and is easily raised into place after the cattle are in a safe position for shipment.

It is a still further object of the invention to provide an adjustable height horizontal beam member to accommodate the differences in height or build of the different breeds of cattle, as well as to provide a desirable form of automatic locking means for holding the horizontal beam member of the stanchion in its elevated position.

Briefly, the device of this invention provides in combination with a cattle-carrying vehicle or conveyance, a retractible form of stanchion for maintaining cattle in alignment and in an upright position during transit, and comprises in combination, a movable and horizontally positioned beam member, a plurality of spaced beam supports connecting the beam with the vehicle, the supports being pivotally connected to the latter and to the beam whereby said beam member may be raised from the floor of the conveyance, or retracted thereto, in a vertically extending plane, and removable locking means between said beam member and the conveyance for holding the beam in a fixed predetermined elevated position under the bellies or body portion of aligned cattle loaded in the vehicle for transit.

A preferred form of the apparatus has a counterweight connecting to the movable beam member so that it is easily raised or lowered with a minimum of effort and so that it may be moved slowly and carefully in a manner not to excite the cattle. Counterweight means also permits manual raising and lowering of the horizontal beam member.

The pivoted supporting members for the beam are also preferably made adjustable so that the beam may be varied to different elevations, for as previously noted, it is desired that the elevated beam extend horizontally just under the body portions of the cattle, since there are differences in the physical structure and leg height of the various breeds of cattle which must be accommodated. The adjustable length supports may be of varying construction, but in a desired arrangement are posts which are pivotally connected to the underside of the beam and to the floor of the conveyance so that they fold down and are covered over by the beam when the latter is lowered to the floor.

One or more of the retractible beam type of stanchions of this invention may of course be used in any one vehicle, depending upon the type of conveyance, and whether the beam member, or members, are placed cross-wise or longitudinally with respect to the conveyance. A single beam may extend longitudinally in a truck or trailer where the cattle are placed across the conveyance. Two beams may extend longitudinally in a railway stockcar, with a closable space being provided at the center of the car so that the cattle may be centrally loaded and positioned in each end of the stockcar.

A complete device, or a plurality thereof, may be easily installed in any vehicle with but a few bolts and it is left in place permanently since the beam member is readily lowered to the floor of the conveyance and thus is out of the way when cattle are being loaded.

It is a particular feature of the apparatus of this invention to have an automatic locking arrangement which has a removable lock bar or pin holding the horizontal beam member in place when the latter is elevated into the raised position. A pull cord or the like is attached to and used with the locking means so that the lock bar may be released and the beam lowered by the operator in a manner so that he is not required to enter the loaded vehicle.

Additional features and advantages of the modified type of stanchion of this invention will be noted upon reference to the accompanying drawings and in connection with the following description thereof.

Figure 1 of the drawing is a longitudinal sectional elevation view of a truck or trailer body with a single horizontal beam type of stanchion apparatus shown extending longitudinally therein.

Figure 2 of the drawing is a cross-sectional elevation through the conveyance and the stanchion apparatus therein, as indicated by the line 2—2 in Figure 1.

Figures 3 and 4 of the drawing show on an enlarged scale one embodiment of an adjustable height pivotally connected support or post attaching the retractible beam to the floor of the conveyance.

Figure 6:
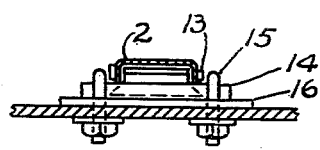

Figures 5 and 6 show on an enlarged scale partial sectional views of the beam member in the lowered position.

Figure 7:
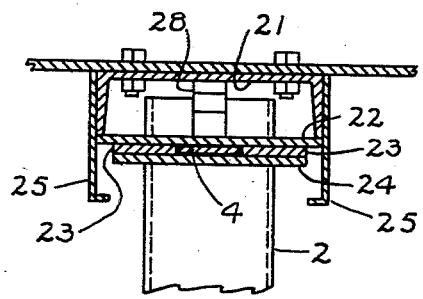
Figure 8:
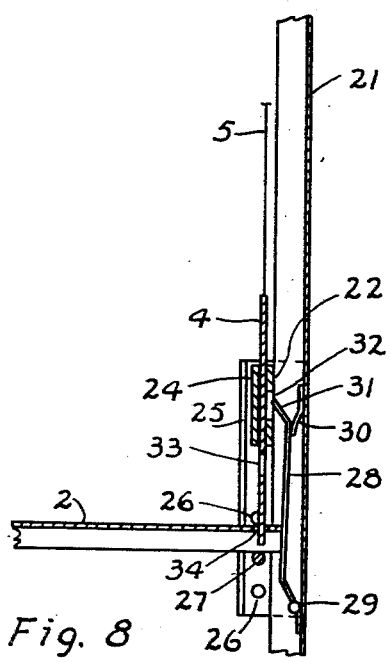
Figure 9:
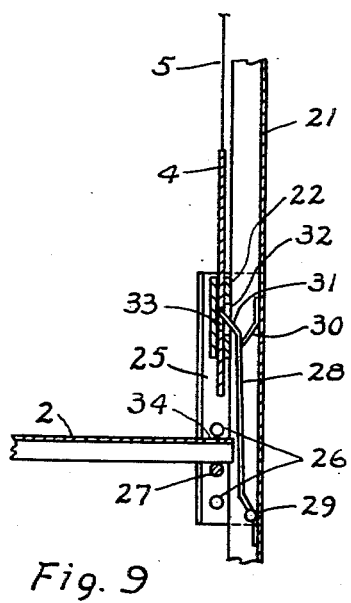

Figures 7, 8, and 9 of the drawing are enlarged sectional views showing the construction and arrangement of the novel locking and releasing portion of the apparatus of this invention. Figure 7 is a sectional plan view as indicated by line 7—7 in Figure 1 of the drawing.

Referring now to Figures 1 and 2 of the drawings, there is shown one embodiment of the present apparatus as used in combination with a cattle-carrying truck or trailer 1. In this instance the retractible beam 2 extends longitudinally within the truck 1 so that the cattle are lined up across the conveyance as indicated in Figure 2. A feed trough 3 may be provided along one side of the conveyance in order to induce the cattle into position more easily. The feed trough will attract the cattle and aid in maintaining them lined up in one direction, so that once having the cattle aligned, the operator will raise the beam 2, by hand or otherwise, and it will automatically lock in an upright position by locking bar 4 as will be described in more detail hereinafter, and the cattle will be prevented from lying on the floor of the vehicle. The locking bar 4 has a cable 5 attached thereto, and the cable 5 extends over a pulley 6 mounted at the front end of the vehicle, and pulleys 7 on the top of the vehicle carry the cable to a pull handle 8 at the rear thereof. The handle 8 and cable 5 are used by the operator to pull up lock bar 4 and release the horizontal beam 2, when it is time to unload the cattle.

A plurality of spaced posts 9 are pivotally connected to the lower side of the beam 2 and to the floor of the truck or trailer 1. As better shown in Figures 3 and 4 of the drawing, the posts or supports 9, in a preferred embodiment, are in two sections with an upper piece 9' and a lower section 9". The two pieces are bolted together by machine bolts 10, and a plurality of vertically spaced holes 11 in the lower section 9" provide means for adjusting the height of each post, and as previously noted, for accommodating varying breeds and height cattle. The top section of the post has a cylindrical portion 12 to accommodate a pin 13 extending through the beam 2, so that a pivoted connection is made with the latter. The lower post section 9" has a rod or shaft member 14 extending beyond the post on each side thereof, and J-bolts 15 hold the post in place on a bearing plate 16 on the floor of the conveyance 1. It may be noted that the beam 2 of the present apparatus is of a channel shape, so that when the beam is collapsed or lowered to the floor, it covers the posts 9 and there are no members, other than the beam 2, which are on the floor of the conveyance that may possibly cause the cattle to stumble. The floor of the vehicle can be recessed for the lower ends of the posts 9 and to receive the retracted beam 2, however, this is in general unnecessary for the cattle can step on or over the relatively shallow beam 2. The beam 2 may of course be a solid member and of wood or other material, however, a channel-shaped beam, as shown, formed from sheet metal is desirable when provided with rounded corners which will not injure the cattle when they rub against it.

In Figures 5 and 6, the beam 2 is shown in collapsed or retracted position, next to the floor of the conveyance. Figure 6 is a section through the beam, as indicated by line 6—6 in Figure 5. Each of the supports 9 pivot on their upper and lower shafts 13 and 14 respectively and fold under the beam 2, with the beam moving in an arc downwardly and in a vertical plane from the raised horizontal position. It is of course necessary to pull the release handle 8 and cable 5 in order to release the locking bar 4 at the front end of the truck prior to pulling the beam 2 down to the floor.

As best shown in Figure 2 of the drawing, a counterweight 17 connects to the front end of beam 2 by a cable 18. The cable 18 runs over a plurality of suitable pulley wheels 19 mounted at the front end of the truck 1. The counterweight 17 may be provided of any suitable heavy material, such as metal, concrete in a pipe section, etc., and is preferably held in place by suitable guides or straps 20. Alternatively, a spring type of counterweight may attach to the beam 2. The counterweighting means is provided, as hereinbefore noted, to aid the operator to more easily raise and lower the relatively heavy beam 2 on the pivoting supports 9.

Referring now to Figure 7 of the drawing, there is shown in plan view the front end of the beam 2, in the raised position, and a cross-section through the locking bar 4 and the supporting and guiding members for the latter. Preferably a vertical channel 21 is bolted on to the front end of the conveyance, and at an elevation a short spaced distance above the beam a plate or bar 22 extends across the flanges of the channel 21 to provide one guide member for lock bar 4. Two side guide bars 23 are attached to the plate 22 and are spaced apart to provide a sliding fit for bar 4, while another plate 24 extends across guides 23 to effect an enclosed slot for the movable lock bar 4. A pair of side support plates 25 connect with the flanges of channel 21 and each plate of the pair has a plurality of vertically spaced holes 26, as better shown in Figures 8 and 9. These holes 26 provide adjustable height positioning for a support pin 27 and are located a suitable distance from the floor of the conveyance, so that the end of the beam 2 rests on pin 27 at heights corresponding to the various heights provided by posts or supports 9.

Figures 8 and 9 also show more clearly the automatic means operating the lock bar 4 in conjunction with the beam 2. As the beam 2 is elevated, the front end thereof is pushed forward to the front end of the conveyance, resting on and sliding over pin 27, so that the end of beam 2 may push against a humped portion of a hinged finger-like member 28. This finger-member 28 is connected to a hinge or pivot 29 at its lower end and is thus attached to the vertical channel 21, while a small compression spring 30 extending between the channel 21 and the back of the finger 28 acts to force the upper bent end 31 of the latter to incline outwardly through a hole or slot 32 in plate 22 and into a hole 33 in the lock bar 4. As best shown in Figure 9, before the horizontal beam 2 is elevated into final position, or when it is retracted, the spring 30 maintains the hinged finger member 28 outwardly and the end 31 holds the lock bar 4 in a raised fixed position. However, as the end of the beam 2 is pushed against the finger 28, as shown in Figure 8, the end 31 of finger member 28 is forced out of the hole or notch 33 in lock bar 4 and the latter is allowed to drop into a slot 34 in the end of the beam 2, thus locking it in its elevated position.

When the operator is ready to unload the cattle from the rear of the truck or other conveyance, he lifts the lock bar 4 out of the slot 34 by means of the pull handle 8 and cable 5 and pulls the beam 2 towards himself, so that the pressure against the hinged-finger 28 is removed and its upper bent end 31 passes through opening 32 into the slot 33 to hold the lock bar 4 up. The beam 2 can then be lowered to the floor of the conveyance, and the cattle no longer being restrained can thus be allowed to walk out of the vehicle.

It is also a feature of the present apparatus to have a manually placed locking bar or rod 35 at the loading end of the cattle conveyance. As best shown in Figures 1 and 5, the rod 35 extends from a hinging means 36 at the rear end of the beam 2 downwardly at an angle and into one of a plurality of holes 37 in a bracket member 38 which is attached to the floor of the conveyance 1. The holes 37 are spaced to accommodate the rod 35 for the different elevated positions of beam 2. When the beam 2 is to be lowered, the end of rod 35 is disconnected from the bracket 38 and folds down against the floor along with beam 2, as shown in Figure 5.

The apparatus shown and described, providing a retractible horizontal type of stanchion, may of course be modified in minor construction details within the scope of the present invention. It may also be noted that a removable chain member, such as 39 in Figure 1, may be used between the end of the truck and the end of the beam 2, so that cattle will not walk around the end of the latter after it is in elevated position under their bellies. Where two stanchion devices are used in axial alignment, as for example in the opposite end of a railway stockcar, then a chain can also be placed between the adjacent ends of each raised beam member and thus maintain the cattle in proper alignment for the full length of the car.

I claim as my invention:

1. In combination with a cattle-carrying-vehicle, a retractable horizontal beam type of stanchion device for maintaining cattle in alignment and in an upright position during transit in the vehicle, and comprising in combination, a movable and elongated horizontally positioned beam extending within said vehicle and adapted for being raised and lowered relative to the floor of the latter, a plurality of spaced beam supports pivotally connecting said beam with the floor of said vehicle, each of said supports having pivot means connecting it with the floor of said vehicle and to the under side of said beam at right angles to the latter, whereby said beam moves in an arc which is in a vertical plane as it is raised and retracted with respect to the floor of said vehicle, counterweight means connecting with said movable beam and substantially balancing the weight thereof whereby said beam may be easily raised and lowered, an automatically placed locking bar connecting with at least one end of said horizontal beam, a finger-shaped member hingedly mounted on said vehicle at an elevation substantially equal to the height of said beam in its raised position and adjacent to the end of the beam, a bent end of said finger-shaped member positioned and arranged to contact and hold said locking bar, guide means positioned adjacent to said locking bar whereby to vertically guide the latter in a position which is above the end of said horizontal beam when said beam is in its raised position, said beam having a slot in the end thereof adapted to receive said locking bar, and said hinged finger member operative to move and release said vertically guided locking bar upon being pushed by the end of said horizontal beam, whereby the locking bar falls into said slot at the end of said horizontal beam and holds the latter in a fixed elevated position as said beam is raised and supported on said plurality of spaced supporting posts.

2. The stanchion device of claim 1 further characterized in that a pulley supported cable attaches to said vertically guided locking bar and extends to a position which is remote from said removable and automatically placed locking bar, whereby said bar may be pulled out from said slot in the end of said beam and the latter released for lowering to the floor of said vehicle.

J. ARTHUR NE CASEK.

References Cited in the file of this patent

UNITED STATES PATENTS

| Number | Name | Date |
|---|---|---|
| 232,770 | Smith | Sept. 28, 1880 |
| 257,708 | Howard | May 9, 1882 |
| 329,841 | Koenig et al. | Nov. 3, 1885 |
| 353,983 | Smith et al. | Dec. 7, 1886 |
| 534,333 | Johnson | Feb. 19, 1895 |
| 976,672 | McLean | Nov. 22, 1910 |
| 1,087,779 | Kaylor | Feb. 17, 1914 |